Jan. 28, 1941.　　　　G. WESTOVER　　　　2,229,689
APPARATUS FOR PHOTOGRAPHIC COMPOSITION OF TEXT MATTER
Filed April 22, 1938　　　15 Sheets-Sheet 1

Inventor
G. Westover:
by
W. E. Evans
Attorney.

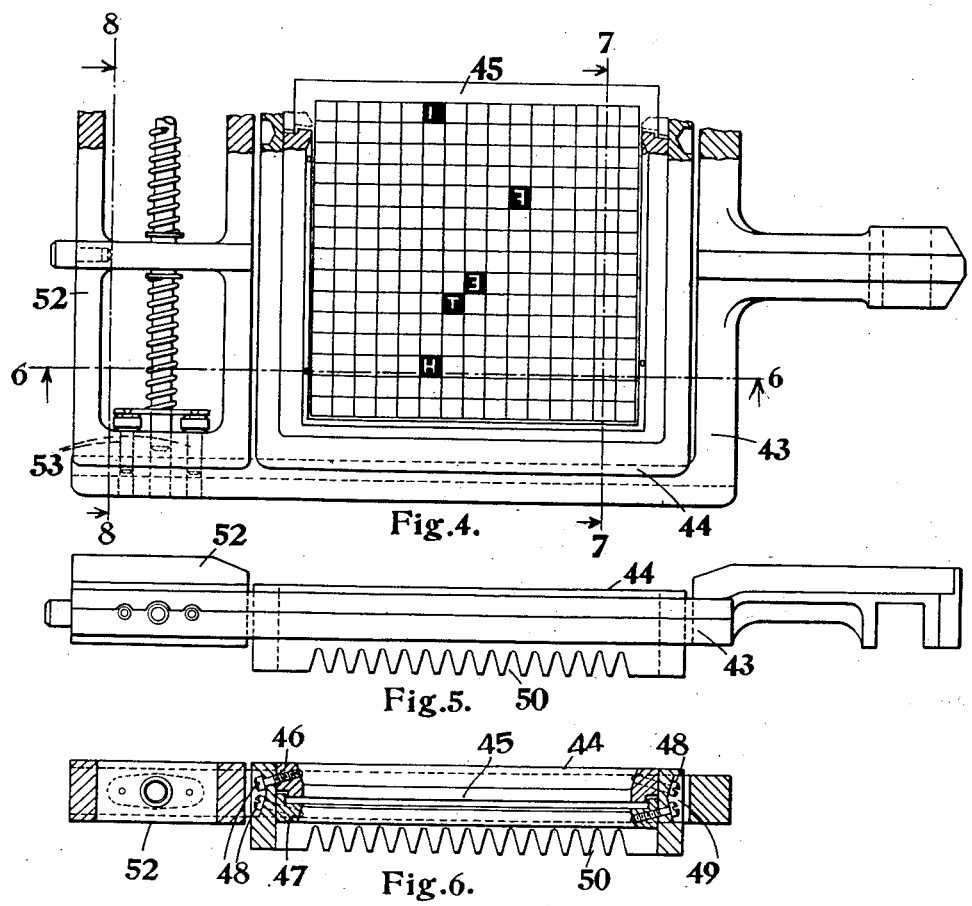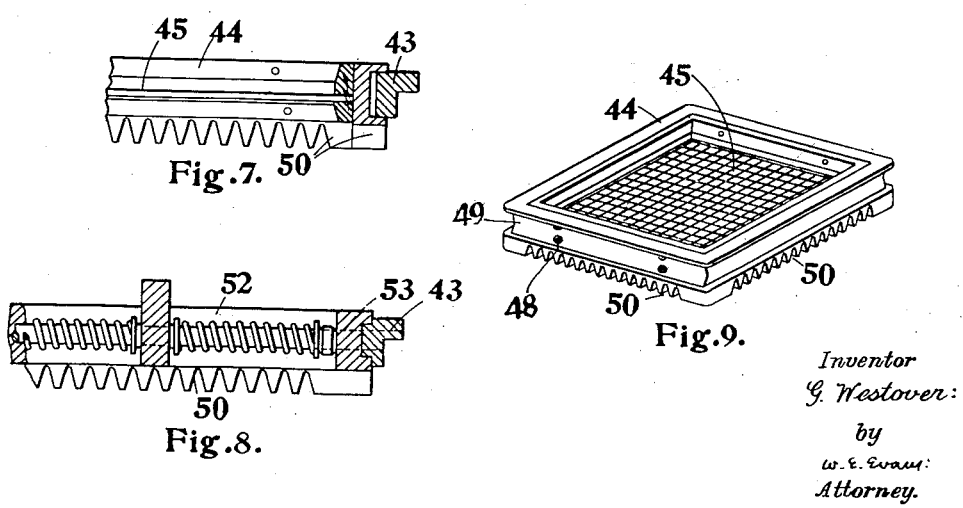

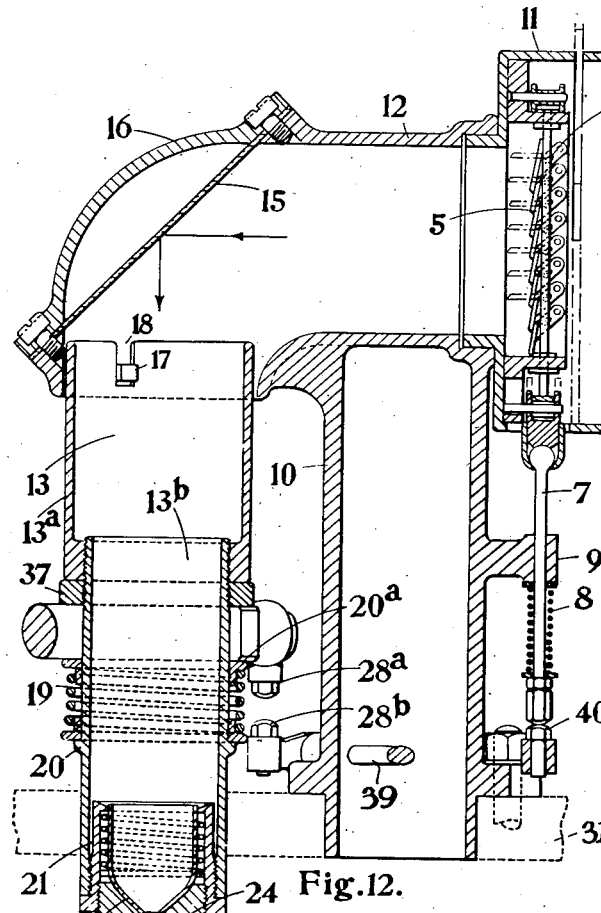

Jan. 28, 1941.　　　G. WESTOVER　　　2,229,689
APPARATUS FOR PHOTOGRAPHIC COMPOSITION OF TEXT MATTER
Filed April 22, 1938　　15 Sheets-Sheet 8
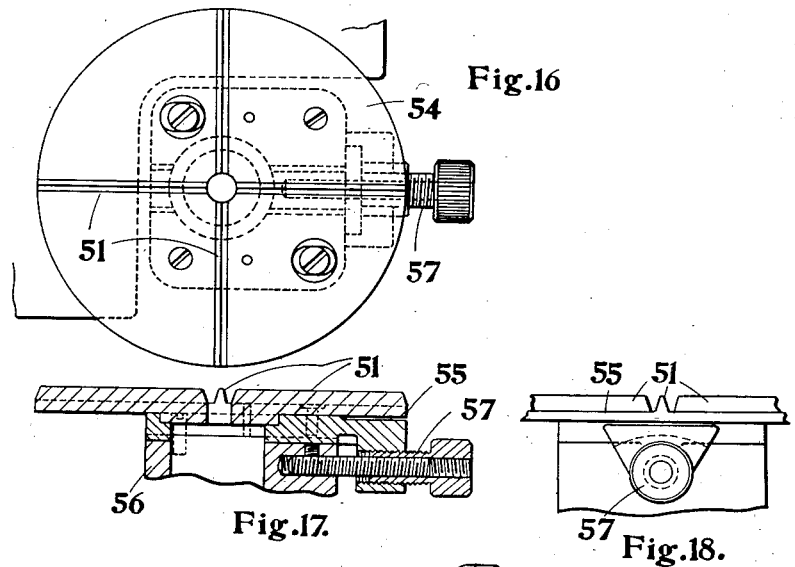
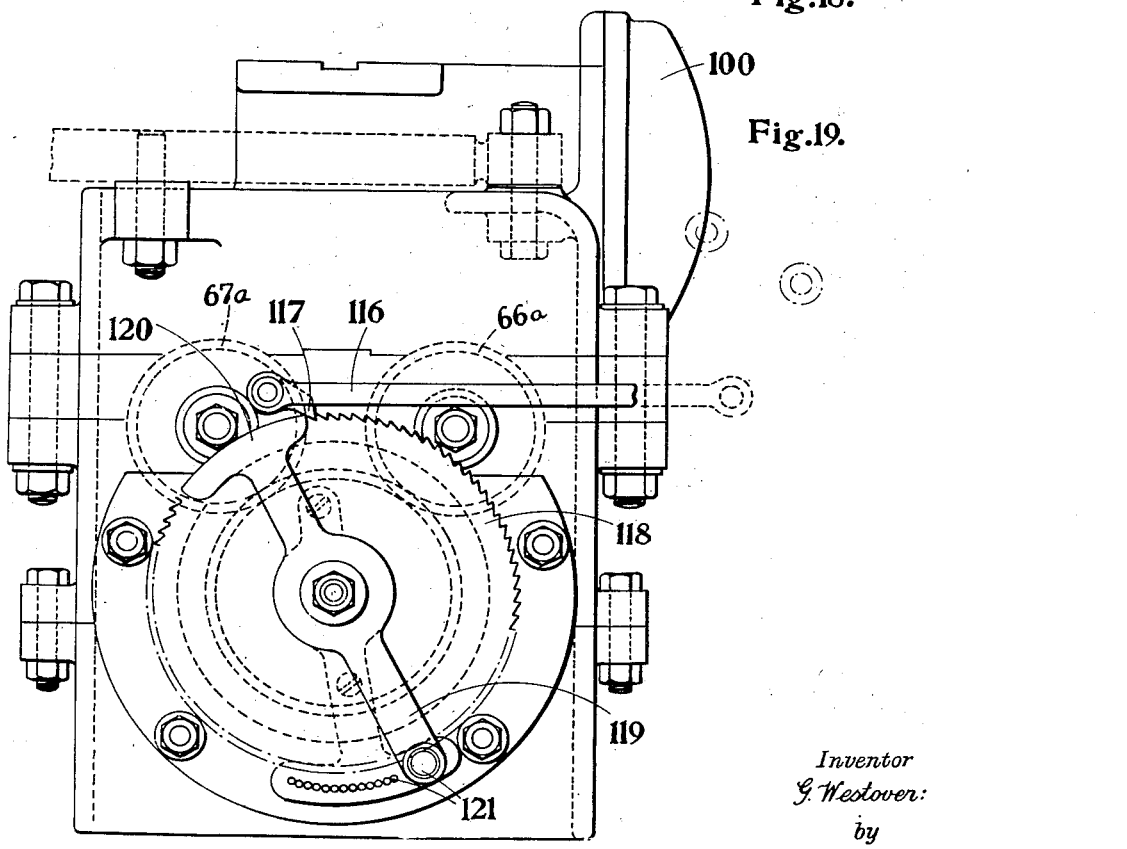
Inventor
G. Westover:
by
W. E. Evans:
Attorney.

Jan. 28, 1941.   G. WESTOVER   2,229,689
APPARATUS FOR PHOTOGRAPHIC COMPOSITION OF TEXT MATTER
Filed April 22, 1938   15 Sheets-Sheet 9

Inventor
G. Westover:
by
W. E. Evans:
Attorney.

Jan. 28, 1941. G. WESTOVER 2,229,689
APPARATUS FOR PHOTOGRAPHIC COMPOSITION OF TEXT MATTER
Filed April 22, 1938 15 Sheets-Sheet 10

Inventor
G. Westover:
by
W. E. Evans
Attorney.

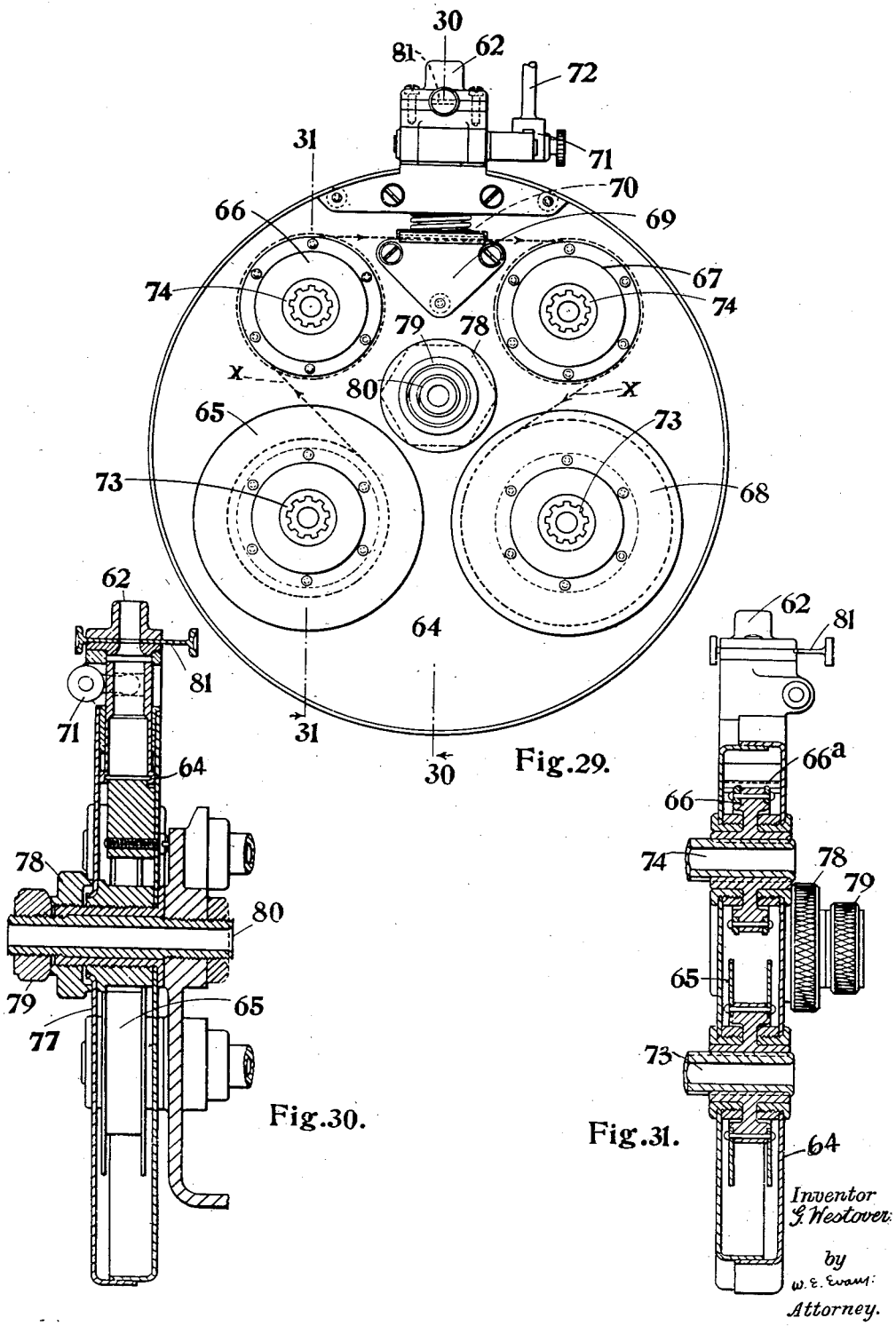

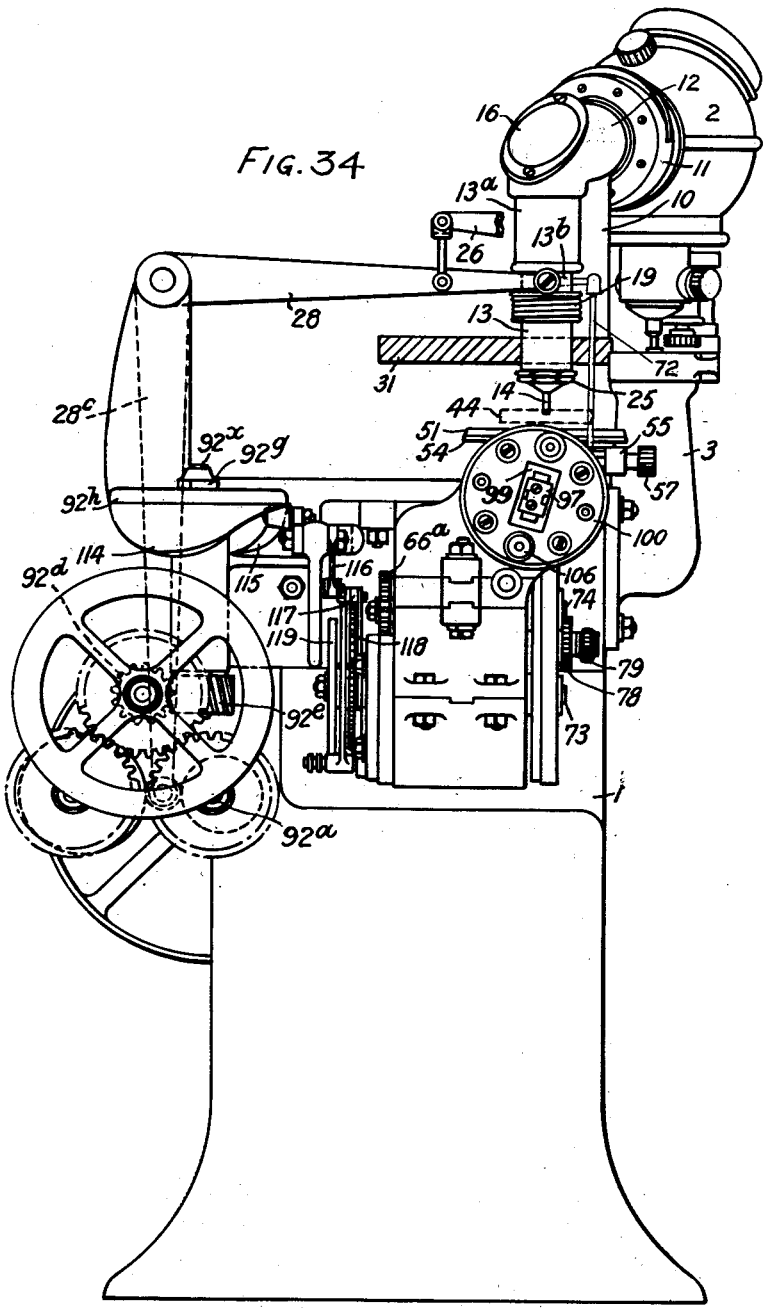

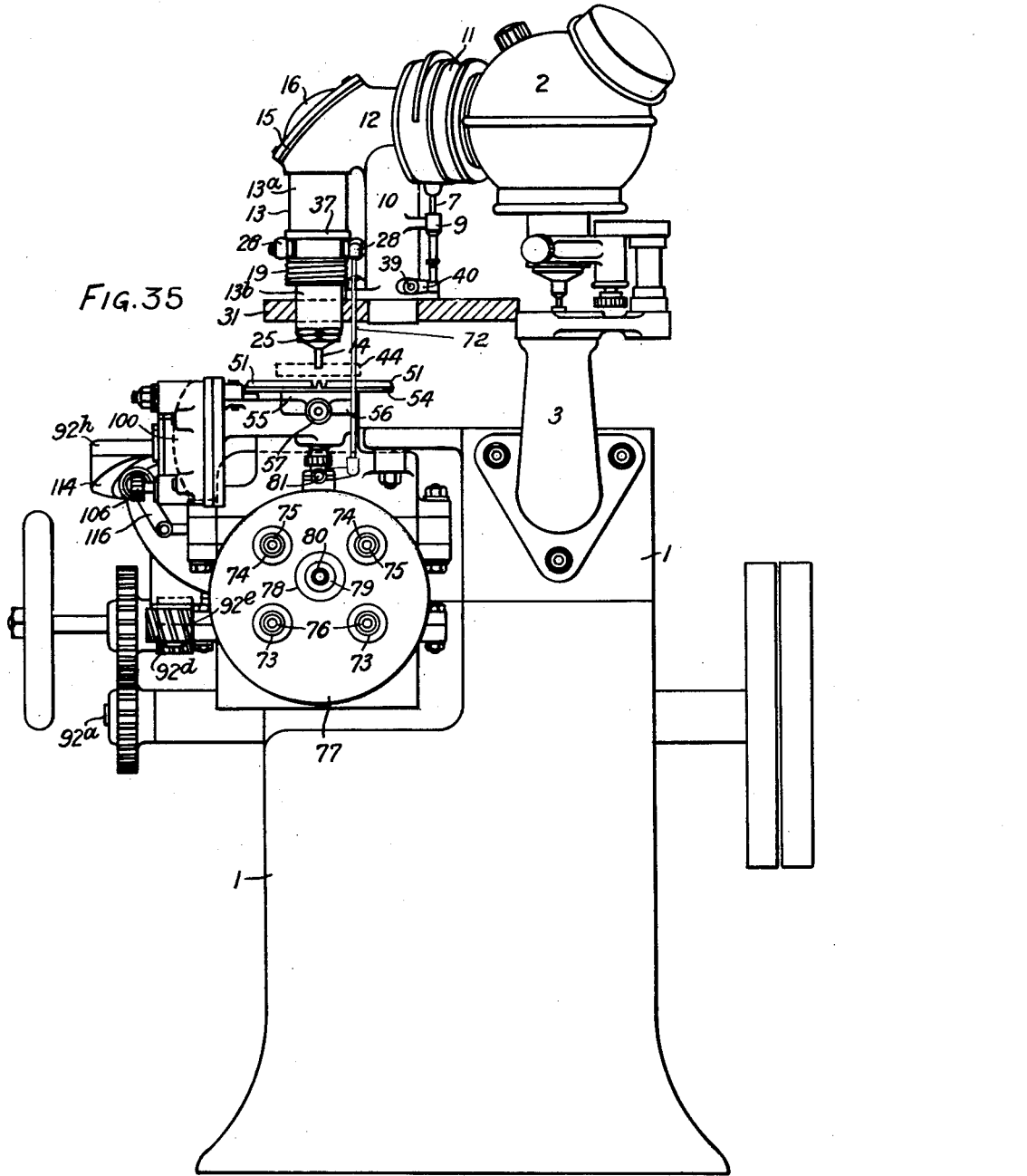

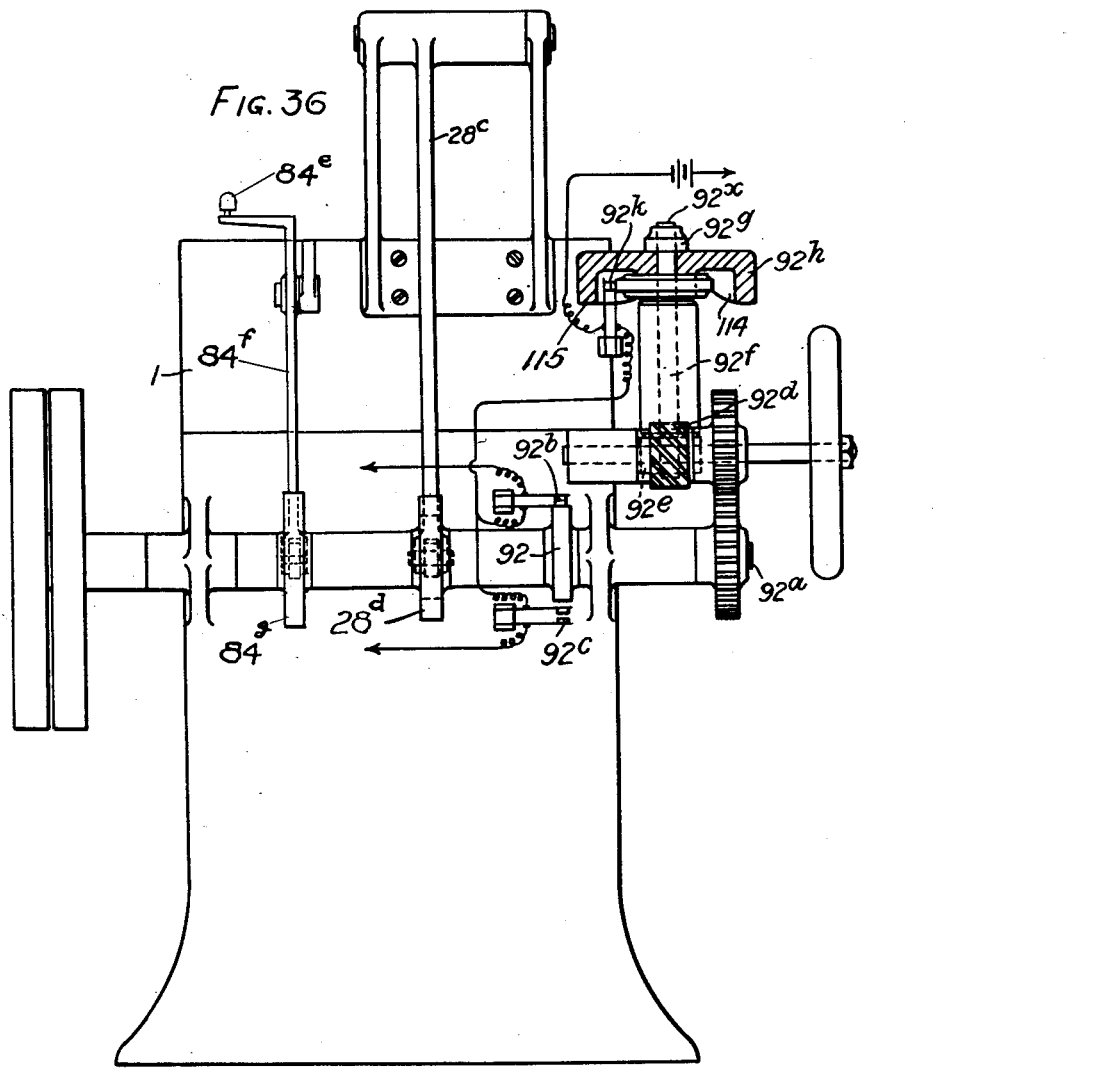

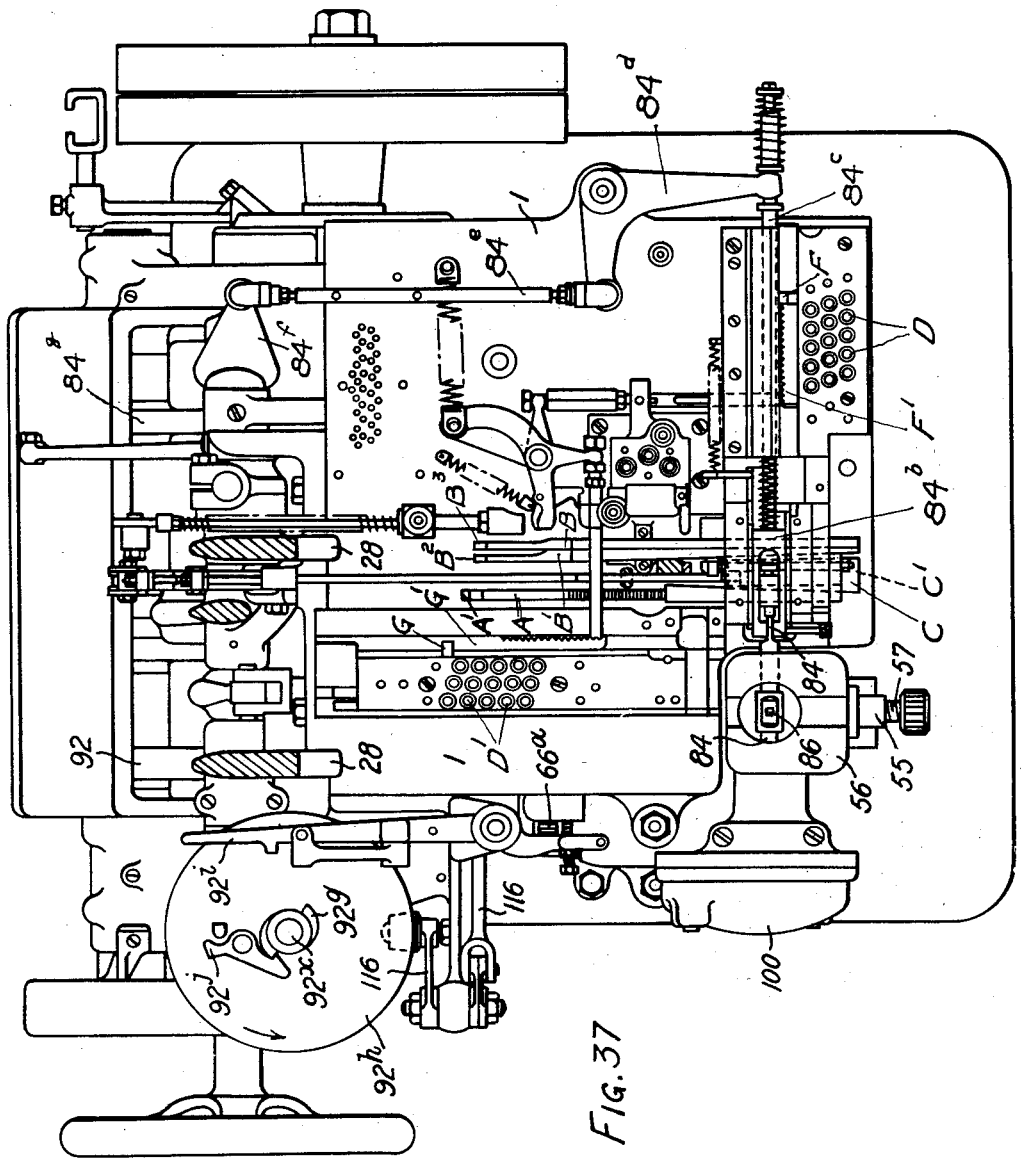

Patented Jan. 28, 1941

2,229,689

UNITED STATES PATENT OFFICE 2,229,689

APPARATUS FOR PHOTOGRAPHIC COMPOSITION OF TEXT MATTER

George Westover, Balcombe, England

Application April 22, 1938, Serial No. 203,881
In Great Britain April 27, 1937

13 Claims. (Cl. 95—4.5)

The invention relates to new and useful improvements in phototypographic machines, and more especially to such improvements in methods and mechanisms for photographically impressing characters one at a time in justified lines, the lines being in longitudinal series on a linewide strip, preparatory for use as line units in page negative make-ups.

The invention consists in the novel methods, steps, sequences, mechanisms and combinations disclosed in the specification and pointed out in the appended claims.

Objects and advantages of the invention are set out in part hereinafter, and in part will be obvious to those skilled in the art or may be learned by practice with the invention.

The accompanying drawings, referred to herein and constituting a part hereof, illustrate one mechanical embodiment of the invention and one manner of carrying out the method of the invention.

Of the drawings:

Figure 4 is a fragmentary plan view of the negative in its holder.

Figure 5 is a side elevation corresponding to Figure 4.

Figure 6 is a section on the line 6—6 of Figure 4.

Figure 7 is a fragmentary section on the line 7—7 of Figure 4.

Figure 8 is a section on the line 8—8 of Figure 4.

Figure 9 is a perspective view of a negative in its holder.

Figure 12 is a sectional view illustrating the general arrangement of the lighting system.

Figure 13 is a corresponding end elevation.

Figure 14 is a sectional plan view on the line 14—14 of Figure 13.

Figure 16 is a plan view of the alignment adjustment mechanism.

Figure 17 is a sectional view corresponding to Figure 16.

Figure 18 is a side elevation corresponding to Figure 17.

Figure 19 is an end elevation of the main feed assembly.

Figure 29 is a front view of the film magazine with the cover plate removed.

Figure 30 is a sectional elevation on the line 30—30 (Figure 29) in the direction of the arrow.

Figure 31 is a sectional elevation on the line 31—31 of Figure 29 in the direction of the arrow.

Figure 34 is a front elevation showing the lever with its actuating cam for movement of the lighting tube, with the carrying bridge shown in section;

Figure 35 is a corresponding side elevation showing the main drive, with the carrying bridge in section;

Figure 36 is a rear elevation showing the main drive, and designed to clarify the diagrammatic view, Fig. 33 of the drawings, the disc cam being shown in section;

Figure 37 is a top plan view, partly in section and with certain parts removed, showing the assembly of wedges, which control the extent of movement for the drive of the film strip winding spool, and their connection with the main driving shaft, the main actuating lever and its pivotal supports being shown in section.

Figure 1:
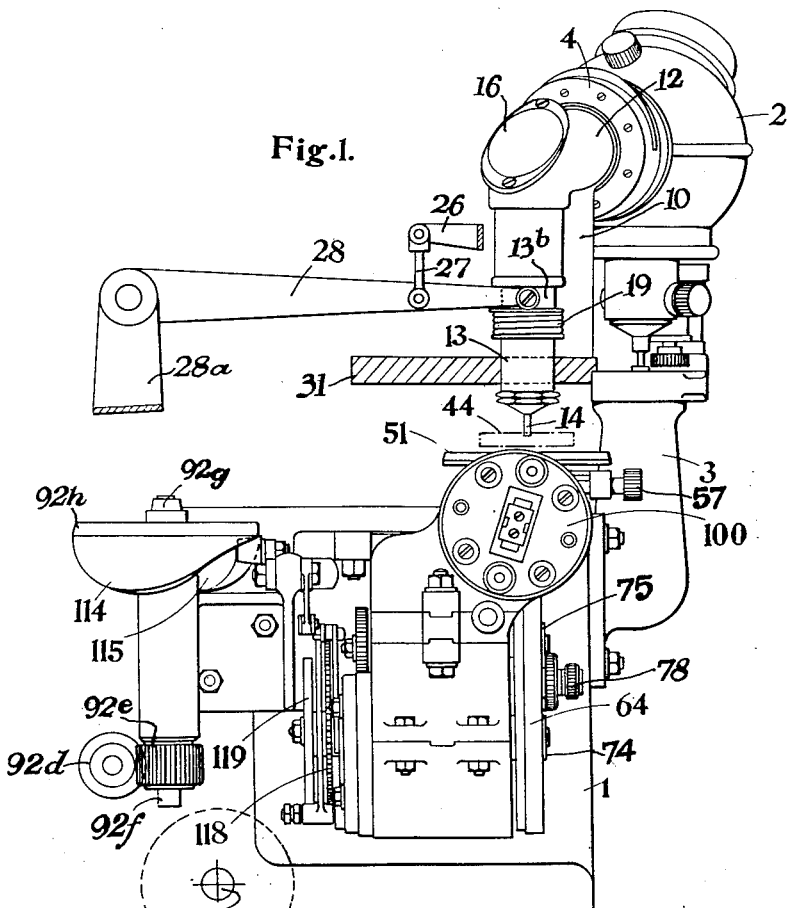
Figure 1 is a front elevation of the general arrangement of the line composing apparatus according to the invention.

The invention relates to that class of typographic composition by photographic methods and mechanisms wherein alphabetical and other characters of a text are photographically impressed in justified line units preparatory to production of page units, proof reading, correction by substitution of correct for incorrect line units, and photographic reproduction of the corrected page units preparatory to making printing plates suitable for rotogravure printing, offset printing, metal planographic printing and the like.

According to the method of the present invention text is preliminarily composed into a record strip, perforations or other signals being formed in the strip, representing the characters, case, punctuation, etc., of the text, and other perforations or signals being formed in the strip which determine and allocate the inter-word spaces of a line, after it has been composed, to effect justification; and thereafter in the typographic machine the characters of the previously-composed strip are presented singly at a light projection locus, and the characters so presented are impressed photographically one at a time on a line-wide, light-sensitive strip. Preparatory to the impression of each successive character, the line-wide, light-sensitive strip is fed, under control of the signals of the record strip, in the direction of its length a distance corresponding to the width of the character about to be impressed, also between the words of the composition the light-sensitive strip is fed longitudinally, likewise under control of the record strip signals, a distance requisite to create inter-word spaces proportioned to effect justification of the line. In accordance with one feature of the method, the light-sensitive strip is moved longitudinally under control of the record strip in two stages after a line has been projected to provide for line margins and to position the strip for a fresh line.

The mechanism of the present invention comprises means for presenting characters of a text singly at a light projection locus, at which locus are light projection means, and as preferably embodied, this mechanism includes a preferably transparent master plate, on which are carried in photographically cognizable form alphabetical and other characters required in composing texts, means operating under the control of the previously composed record strip, and through mechanically variable coordinates to present a selected character at the light projection locus, the mechanically varied coordinates moving the master plate in two directions at right angles to each other in one plane, to position a selected character at the lens or other light projection point; means for maintaining and presenting at the light projection locus, and for longitudinally feeding, a long line-wide, light-sensitive strip, the preferred form of said means comprising reels on which a light-sensitive strip is wound, and reel-actuating means operating under the control of the signals in said previously-composed record strip for feeding the light-sensitive strip proportionally to the widths of the characters and to the length of inter-word spaces required to justify the lines; also means operating under the control of the record strip for advancing the light-sensitive strip to provide inter-linear margins or margins at the beginning or end of each line for proper page positioning on the line strips.

In this preferred embodiment, all the characters and the like on the master plate are 12-point typographic size, and the optical magnification produced is constant, so that the point-size of the characters projected on the line-strip is also constant. Although the characters on the master plate are 12-point for different reproductions on the line-strip the relative width of these characters may be varied.

The record-strip preferably employed, in accordance with the present invention, to control the operations of the essential mechanisms of the machine, is of importance chiefly as regards the functions performed by the signals or perforations in it. The machine for preparing or composing this record-strip forms no part of the present invention, and is of known construction. The actual machine, which may be employed, is shown and described in U. S. Patent No. 944,405. The record-strip composed in this machine is intended to control the operations of a single typecasting and composing machine. It is not considered necessary to describe this record-strip composing machine but, as the record-strip as composed thereon can be employed equally well in the carrying into effect of the present invention, it is deemed desirable to give certain details of the various signals in the record-strip and the functions they perform.

The machine is controlled from a keyboard, the keys of which through permutation mechanism are coupled to two main groups of punches or perforating devices, and the usual signal for a character or other printing element consists of two components, one made by a punch in each group of punches.

Some of these perforations constitute signals which in a single type-casting and composing machine controlled by the record-strip control gauges with which positioning mechanisms cooperate to move a matrix case, or die case, in two directions to bring a selected character or the like over the mould. One of the components also controls a variable device, or wedge, for determining the extent of the mould opening in accordance with the width of the character selected. The record-strip is also provided with justification perforations—two groups for each line—which position justification means in the casting machine, so that quads are cast of a size such that the required justification for a line is distributed amongst the inter-word spaces. This record-strip is passed through the casting machine in a direction reverse to composition, so that the justification mechanism for a line is set before the composition of the line is commenced, but is only brought into operation when an inter-word space is to be produced. Other signals in the record-strip control this transfer of the mould-dimensioning mechanism to the character-dimensioning mechanism, plus the justification-dimensioning mechanism. Other signals in the record-strip control mechanism for sending away or removing the composed and justified lines. An example of a machine is shown and described in U. S. Patent No. 625,998. In carrying the present invention into effect certain mechanisms are controlled by a record-strip as would control certain mechanisms in the machine shown and described in U. S. Patent No. 625,998. It will be understood that the foregoing general description and the following detailed description as well are exemplary and explanatory but are not restrictive of the invention.

Referring now in detail to the embodiment of the invention illustrated by way of example in the accompanying drawings, the mechanism includes the following essential parts, a camera and lens with a light source and shutter mechanism, composite negatives suitable for photographic reproduction carried in a holder and adapted to be moved, under the control of a previously controlled record-strip, to present the appropriate character for projection on to a light sensitive surface or strip and means for feeding the strip in synchronism with the operation of the photographing means and proportionally to the width of characters to be impressed and proportionally to the inter-word spaces required for symmetrical line justification.

The apparatus (Fig. 1) is mounted on a main stand 1, the lighting unit being supported as hereinafter more fully described on the side of the main stand in such manner as to be adapted to project a ray of light downwardly from above the stand through a negative bearing the character to be projected which is held in a holder. The main feed assembly is mounted on the front of the main stand below the level of the holder and the magazine for the film spools in a similar position on the front of the main feed assembly.

The lighting system (Figs. 1, 2, 3, 12 to 15) comprises a lamp 2, which is supported on a pillar 3 on the main stand. The lamp is advantageously a spot arc lamp, preferably arranged with a condenser to eliminate any trouble on account of heat, and is adapted to project light horizontally through a shutter 4 (Figures 12 and 13). The shutter 4 consists of a series of slats 5 pivotally mounted in a frame 6 so as to be adapted to be opened and closed by means of a rod 7. The rod 7 is mounted for vertical movement under the pressure of a spring 8 in a bearing 9 secured on a supporting pillar 10.

The frame 6 is secured by bolts within an annular flanged member 11 secured in the horizontally extending end of an elbow tube 12, which is supported on the pillar 10. Extending downwardly from the tube 12 is a lighting tube 13 which is adapted for a limited reciprocating movement against spring pressure, as hereinafter described, to bring a sliding tube 14 (Figs. 1 and 12) yieldingly carried at its lower end over the selected character on the negative 45.

A reflector 15 is mounted at the angle of the tube 12, and is held in position by means of a cap or cover 16 formed with an annular flange which is secured by bolts to the tube 12.

The lighting tube consists of two parts of progressively decreasing diameter from the top downwards. The part 13$^a$ (Fig. 12) extends at its upper end a short distance within the tube 12 wherein it can slide and is prevented from rotation by means of a stop 17 projecting from the inner wall of the tube into a slot 18 cut in the rim of the part 13$^a$. The central part 13$^b$ of the tube is externally screw-threaded at the upper end to be received within the internally screw-threaded lower part of the part 13$^a$ and is provided with a surrounding coiled spring 19 held between a lower fixed flange 20 and an upper movable flange 20$^a$. At its lower end the part 13$^b$ is internally screw-threaded to receive an externally screw-threaded part of a sleeve member 21 carrying a cup-shaped member 22 resiliently mounted therein, and formed to taper conically at the bottom and to merge into the tube 14 which is of cross-section to fit exactly over the selected character on the negative plate in the holder. The cup-shaped member 22 is held in position at the bottom of the part 13$^b$ of the tube 13 by means of a block 24 screw-threaded in the sleeve member 21 and locked in position by a nut 25.

A lever 26 (Figs. 1 and 15) is connected through a link 27 to one arm of a bell-crank operating lever 28, the other arm 28$^c$ of which is actuated from a cam on the driving shaft. The lever 26 embraces an externally screw-threaded sleeve 29 slidably mounted on the part 13$^a$ of the lighting tube 13 being pivotally connected at a central position thereof. At its other end the lever 26 is fulcrumed to a post 30 secured on the carrying bridge 31 of the machine. A collar 32 (Fig. 15) is screw-threaded on the sleeve 29 above the lever 26, the lever 26 in the part surrounding the sleeve being recessed to accommodate a coiled spring 33 so that in the downward movement of the lever 26 a resilient pressure is applied on a crosshead 34 connecting two sliding pillars 35, 36 on either side of the lighting tube 13 and passing through bearings in bridge 31 the lower ends of pillars 35, 36 being secured to the frame 41 supporting the negative holder slides. A lock-nut 37 being provided for holding the parts 13$a$ and 13$b$ together. The main actuating lever 28 is pivotally mounted on the part 13$b$ of the lighting tube so as to be adapted to apply a resilient downward pressure through the spring 19 to move the tube 14 yieldingly on to the negative plate.

The lever 28 carries a projection or tappet 28$^a$ (Fig. 12) which in the depression of the lever 28 is adapted to bear against a tappet 28$^b$ carried at the end of a crank arm 38$^a$ (Fig. 14) of a crank 38 which is carried at one end of a shaft 39 mounted in bearings in the pillar 10 and at its other end carrying a crank 40, a tappet 40$^b$ mounted on the crank arm 40$^a$ of which bears against the lower end of the rod 7 to move the rod upwardly against the pressure of the spring 8 to open the shutter.

In the embodied means for presenting the characters for impression by light action on the line strip, within a frame 41 (Fig. 15) is mounted a frame 42 which carries the negative holder 43 within which is mounted a negative sub-frame 44.

Thus in the operation of the actuating lever 28 as by a cam 28$^d$ on the main driving shaft 92$^a$, the lever 26 first lowers the frame 41 carrying the frame 42 and negative holder 43 into a position in which the sub-frame 44 is located to bring the selected character on the plate 45 into the exposure position in line with the tube 14 and then the lever applies a resilient pressure through the spring 19 to lower the lighting tube 13 so that the tube 14 contacts with the master plate 45 and encloses the character to be projected, the lever 28 finally operating to rotate the shaft 39 to open the shutter 4 and to permit light to pass on to the reflector 15 and thence through the tubes 13 and 14, the negative 45, through the lens 59 and on to the film as hereinafter described.

The character negatives which are mounted within the sub-frame 44 are of a kind suitable for photographic reproduction by transmitted light.

Conveniently they may be photographed upon a glass plate negative in fifteen rows, fifteen in each row, 225 characters in all, each within a square of 0.2 inch side. A standard body line is adopted for the characters, 0.14 inch from the top of the 0.2 inch square allotted to each character, and the side line chosen is 0.02 inch from the side of the 0.2 inch square. Statistics have shown that these standards will accommodate almost all styles of typographic faces at least for 8 to 12-point reproduction.

The negative or master plate 45 (Figs. 4, 6, 7, 9, 11, 12 and 15) bearing the characters is set within the sub-frame 44 which is loosely mounted within the frame 43 within which are arranged two superposed co-operating rectangular frame parts 46, 47. The negative or master plate 45 is held between the parts 46, 47 and removably secured therebetween by means of pairs of screws 48, provided at convenient positions in a surrounding groove 49 in the sub-frame 44, the screws extending at inclinations respectively upwardly and downwardly in the top and bottom parts 46 and 47 of the sub-frame.

The underface of the sub-frame 44 is formed with two series of rack teeth 50, of tapering form disposed mutually at right angles and adapted to engage with locking bars 51 disposed in an adjacent position on the machine frame beneath the negative frame and also mutually disposed at right angles to each other. The locking bars 51 extend beyond the edges of the frame so as to be adapted to engage with the rack teeth 50 to locate the frame whatever the extent of movement of the frame.

The sub-frame 44 is approximately positioned with respect to the camera lens by a two-way movement of the carrying frames 42, 43 which are moved by record-strip controlled positioning mechanism, the final positioning with precision being effected by the engagement of the rack teeth 50 with the locking bars 51.

To enable the sub-frame 44 to be readily removed, a frame 52 (see Figs. 4, 5, 6 and 8) is provided at one end of the frame 43 held in position by spring pressed pins 53 extending through holes in the walls of the frame part 52 to project into holes correspondingly provided in the frame 43.

The sub-frame 44 is loosely held in the frame 43. A slight clearance is maintained between the sub-frame 44 and the frame 43 to permit of slight lateral movement of the sub-frame with respect to the locking bars 51 which finally position the sub-frame.

Figure 10:
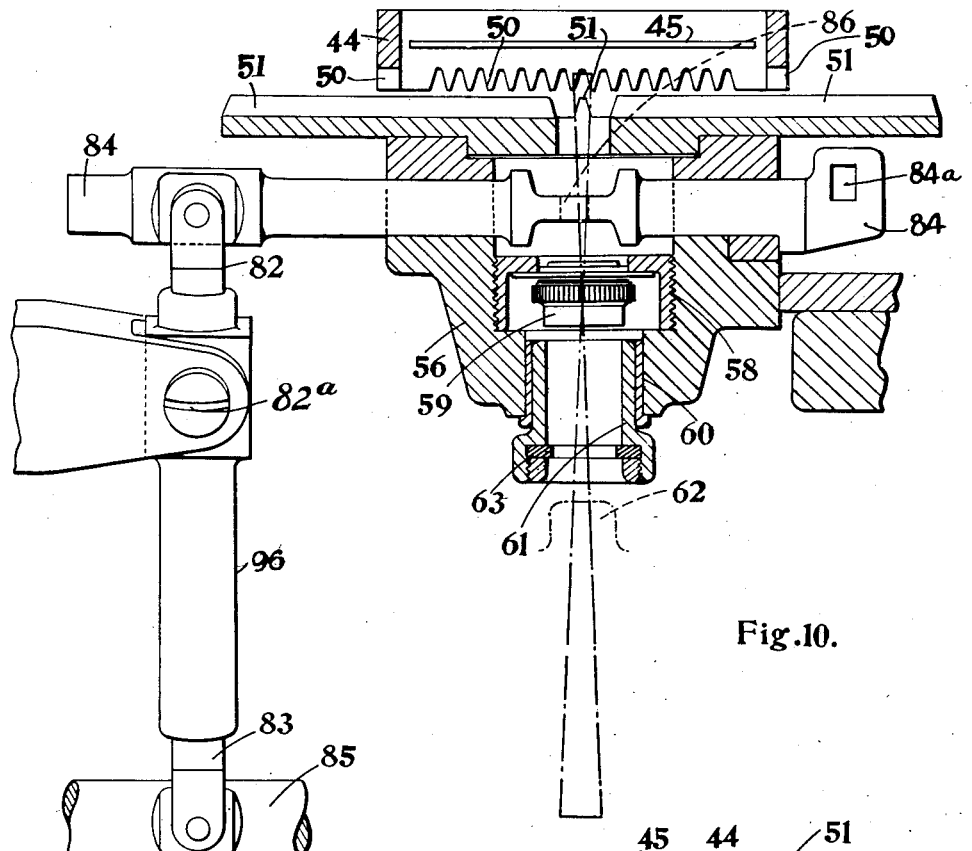
Figure 10 is a sectional side elevation illustrating the holder locating mechanism and showing part of the film feed mechanism.
Figure 11:
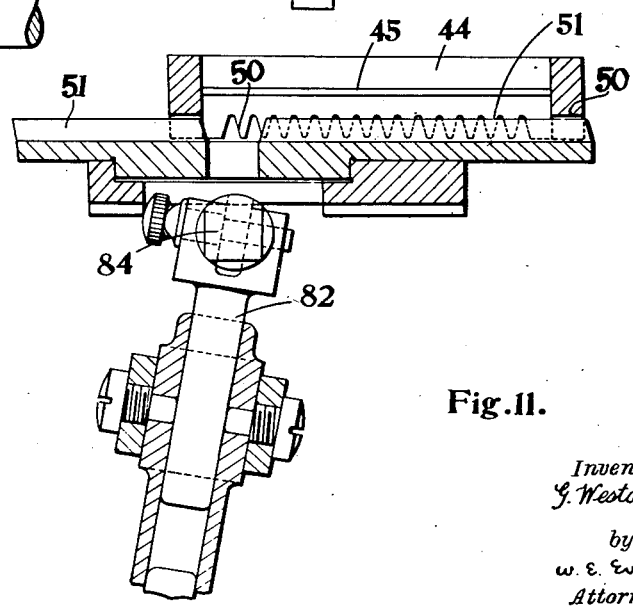
Figure 11 is a sectional part front elevation corresponding to Figure 10 with the holder in the located position.
Figure 15:
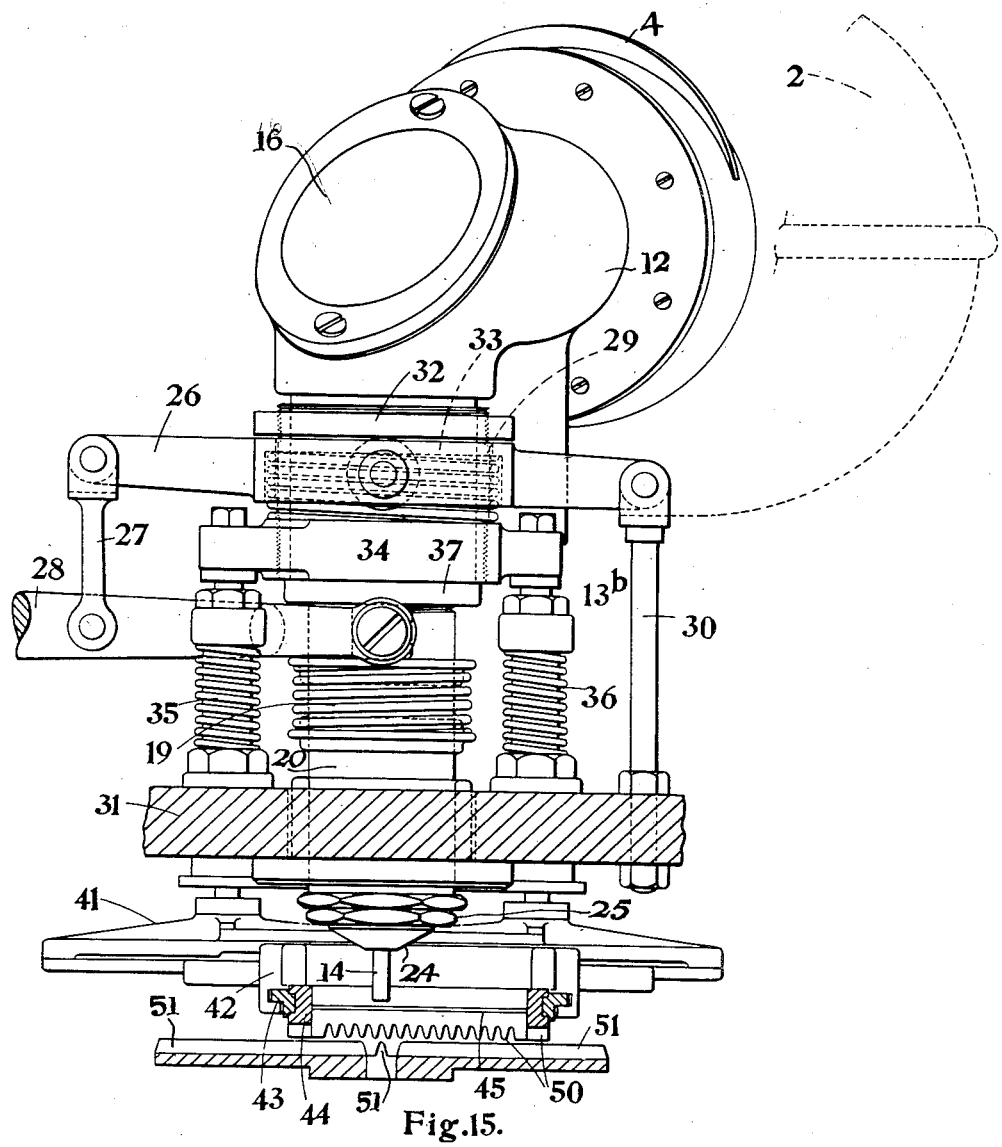
Figure 15 is a general arrangement on an enlarged scale of the means for lowering the negative holder and lighting tube of the lighting unit into position for projection.
Figure 20:
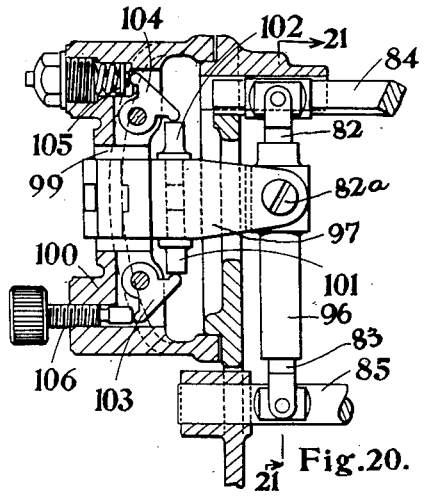
Figure 20 is a detail sectional side elevation of the set adjusting mechanism and Figure 21 is a corresponding sectional view on the line 21—21 of Figure 20.
Figures 21, 22:
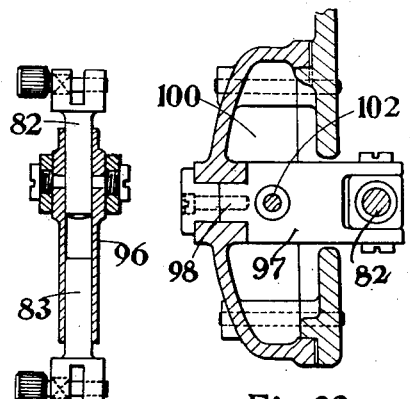
Figure 22 is a part sectional plan view of the housing of the set adjusting mechanism.
Figure 23:
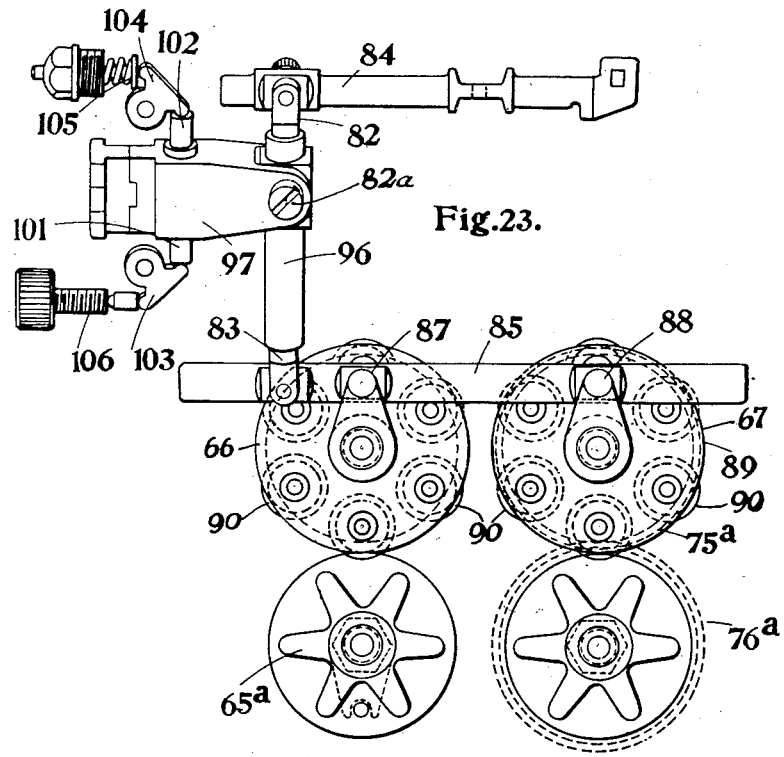
Figure 23 is a side elevation showing the operative relation between the set adjusting mechanism and the solenoid feed mechanism.

The locking bars 51 which ensure location in the direction of the depth of character are provided with a fine differential screw alignment adjustment as illustrated in Figures 16, 17 and 18 of the accompanying drawings so that a transverse adjustment of the location of the image can be effected on the strip on which it is to be projected. Thus the locking bars 51 are mounted on a disc 54 secured to a part 55 which is adapted to slide on a part or fitting 56 under the influence of a differential screw mechanism 57. The part or fitting 56 is of generally conical form with a centrally formed opening extending through it (Fig. 10). Mounted in a screw-threaded bushing 58 in the fitting 56 so as to be readily adapted for replacement or adjustment is a camera lens 59, and beneath the lens is mounted a sleeve member 60 surrounding a tubular part 61, which is formed to receive a projecting part 62 (Figures 29, 30 and 31) secured as hereinafter described on the top of the magazine containing the film spools. A felt washer 63 is held within the part 61 to prevent stray light entering the magazine.

In the character photographing means as embodied, the camera lens covers an object field of 0.2" square and as hereinafter described will produce an image magnified in the ratio 71/30. The lens should be fast and in order to avoid large object and image distances ($u$ and $v$ respectively) should be of short focal length. It will be found that a lens of 4 cm. focal length will be satisfactory, giving $u=5.69$ cm., $v=13.47$ cm., and $u+v=19.16$ cm.

The camera part of the apparatus as will be understood is in its simplest form, requiring no focussing beyond the necessary adjustment of the lens to give the best possible definition in the first place. The distances from the object (the original character negative) to the lens and from the lens to the intermediate line image (the 16 mm. film) with a ratio of enlargement of 70/31 are 5.69 and 13.47 centimetres respectively, the total distance from the obect to the image thus being 19.16 centimetres or just over 7½".

Referring now to the embodied form of means for longitudinally feeding the light-sensitive strip proportionally to the width of characters to be impressed, and to effect the inter-verbal spacing required for line justification, the lines of characters are photographed on light-sensitive strips in the form of 16 mm. cinematograph film such as is in common use which are carried in a light proof magazine 64 (Figures 29, 30 and 31). The film X is wound on a spool delivery 65 which is mounted to rotate in the magazine and is carried over two feed drums 66 and 67 mounted in horizontal alignment beneath and on opposite sides of the exposure position to wind on to a receiving spool 68 in horizontal alignment with the spool 65. In the process of projection the film is wound step-by-step from the spool 65 on to the spool 68. The spools are formed as flanged sleeves fitted with spring clips to hold the ends of the film.

The feed drums 66 and 67 are provided with sprocket teeth 66ª to engage the perforations in the film. The drums 66 and 67 are geared together so that there is no possibility of relative movement and the initial tension on the length of film between the drums remains constant without stretch or sag.

The projection takes place at a mid-position between the two feed drums 66 and 67, and the film is supported at this position in a triangular block 69, in the top centre of the magazine 64. The sensitized surface of the film is uppermost and thus does not come into contact with the block 69.

Means for producing a grain or screen figure in the photographed design, for use when necessary or desirable, are provided. In photogravure it is usual to employ screens of 150 lines per inch for the illustrations and text if both illustrations and text are etched together on the copper plate or cylinder. If however the text is etched separately as is frequently done in the best class work a screen of 175 lines per inch is used for the text. According to the method of the invention in such work a screen 70, of selected pattern, may be secured under spring pressure to clamp the film in the exposure position (Figure 29) and the screen may be operated through a crank 71 and lever 72 from the mechanism for lowering the negative frames 41 in synchronism with the other movements.

The spools 65, 68 and feed drums 66, 67 are provided respectively with hollow sleeves 73, 74 which are machined to engage on four shafts or spindles 75, 76 which project from the main feed assembly Figs. 24-27, 29 and 31.

In order to provide the necessary movement of the spools 65, 68 (as distinct from the feed drums 66, 67) in the magazine, the two additional shafts 76 are provided in the main feed mechanism (Figs. 23, 25–27). The shafts 76 are situated immediately below the feed drum shafts 75 and one of them is connected by gears 75a, 76a to the shafts immediately above. The shaft of the spool 65 is not connected in any way with the shaft above it but is fitted with a friction device 65a in the form of a spring device which tends to lock it. Thus the movement of the spool 68 to wind up the film after exposure is obtained. The shaft of the spool 65, owing to the fact that it is fitted with the friction device 65a will tend to drag and so keep the spool 65 from unwinding to excess. In other words this friction device will tend to keep the film at constant tension so that the film in the magazine will be under definite control throughout while being exposed and fed.

The cover 77 of the magazine may be secured thereto by a milled nut 78, and the magazine itself is held in position by a nut 79 screwed to a stud 80 secured in the main feed assembly.

The magazine is fitted with a sliding shutter 81 at the top immediately beneath the bottom projecting part 62 which is maintained closed until the magazine is fitted in position for operation.

The shutter 81 is opened manually after the magazine 64 has been put in place and closed before removal of the magazine.

The width across the sensitised strip between the sprocket holes is 10.5 mm. which is equal to 29.9 points. By adopting 28.4 points as the image size a margin of 0.01 inch is provided at each edge of the sensitised strip between the sprocket holes and the image of the original 0.2 inch square. Since the original characters are of constant heights, for example 12-point, the magnification required is 28.4/12 which is equal to 71/30. Apart from utilising all the available space on the sensitised strip, a size of 28.4-point for the image is also suitable for the following reason: Obviously it would be a great convenience to make the circumferential distance between adjacent teeth on the film-driving sprocket equal to one em of the film image, or better still, since a complete line frequently may be so many ems and a half, equal to one en, because one then knows, by feeding on so many teeth, that an equal number of ens have gone into that line. Now the diametrical pitch of the sprocket is equal to the number of its teeth divided by its pitch diameter and the feed (or circumferential pitch) is equal to π divided by the diametrical pitch. Therefore if a diametrical pitch of 8 be chosen, the feed is equal to 0.3927 inch which is equal to 28.4 points, i. e. one em of the image of the strip. If the number of teeth be made double this, equivalent to a diametrical pitch of 16, the feed per tooth is equal to one en (instead of one em) of the image of the strip, as desired.

Now 28.4-point is very nearly equal to one centimetre, so that a calculation to determine what length of sensitised strip is required to take so many ems of reproduction is simple; the length required is approximately equal in centimetres to the number of ems of its own body, plus whatever small allowance is necessary for the margins. Thus for example a page set in 12-point to 4 inch measure (i. e. 24 pica ems) would require 24 cm. of sensitised strip per line plus the margin allowance, and a page set in 10-point to 3⅓ inches measure (equivalent to 24 cms. of 10-point measure) would also require 24 cms. of sensitised strip per line, plus margin allowance. These margins which may conveniently be referred to as pseudo margins are not the page margins but they make one line to be distinguished from the next. Provision is made to accommodate line measures of 12½ ems to 32½ ems in steps of 2½ ems, these measures being inclusive of the pseudo margins referred to.

As the diametrical pitch of the sprocket drive of the sensitive strip or film is 16 and the circumferential pitch is equal to one en, 9 sprockets will be required to give the chosen film measures. The numbers of teeth on the various sprockets will be 25 to 65 in steps of 5.

The intermittent drive for spools of the sensitised strip or film is in accordance with the exact width of the character or space to be projected and this width is the same by whatever means the character is finally reproduced, as hereinafter described.

Figure 33:
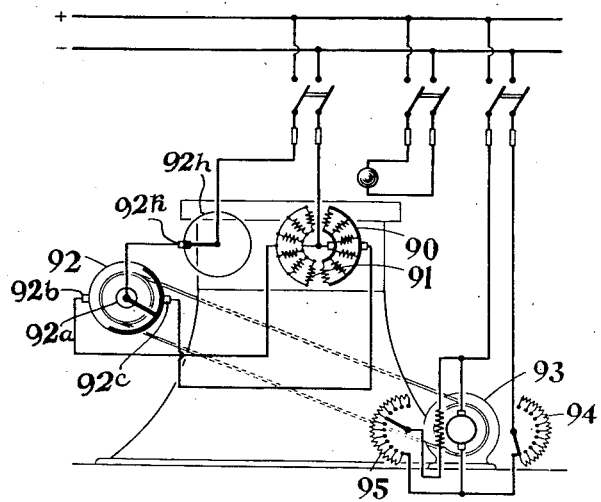
Figure 33 is a diagram of the electrical circuits.
Figure 26:
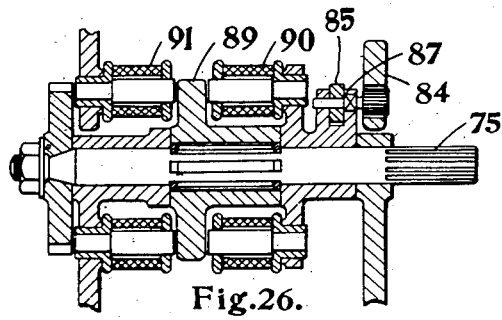
Figure 26 is a detail sectional view of the solenoid feed mechanism.
Figure 24:
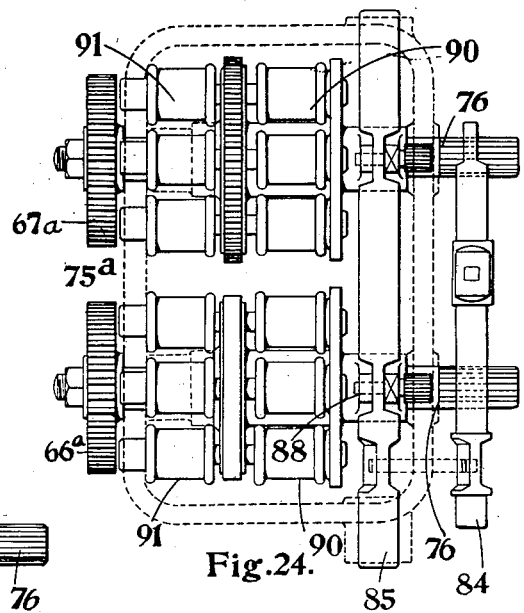
Figures 24 and 25 are corresponding plan and side elevation respectively of the solenoid feed mechanism.
Figure 27:
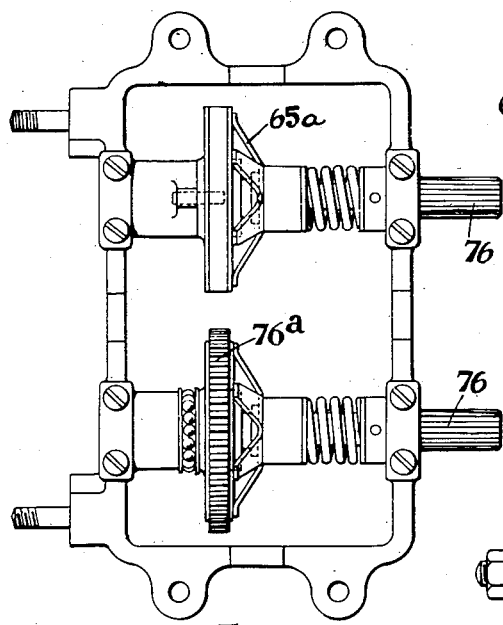
Figure 27 illustrates the constant tension device for the film, viewed from below.
Figure 25:
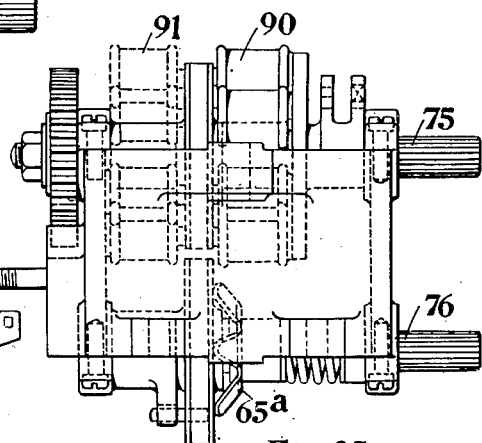

This driving mechanism (Figs. 10, 11, 20–23, 28) comprises a lever pivoted at 82a on a bracket and formed with two arms 82 and 83. The lengths of the two arms being in the ratio 30/71, the short arm 82 being pivoted to a driving bar 84 and the long arm 83 on a drum bar 85 feeding forward the strip or film. The blade bar 84 is coupled by an opening 84a with a sliding member 84b which may be operated through a rod 84c connected to bell-crank lever 84d, link 84e, lever 84f moved by cam 84g on driving shaft 92a, Figs. 36, 37. This bar 84, in order to impart proper feed movements to the bar 85 for the sensitized strip, is drawn against an adjustable and variable stop. This stop is varied in accordance with the width of each character projected, and for each inter-word or justification space, under the control of the record-strip. A convenient mechanism for this purpose comprises movable wedges, viz. a normal wedge A for characters, two wedges BB′ for justification spaces, and two transfer wedges CC′ (Fig. 37) by which latter wedges the movements of the bar 84 are determined as necessary, either by the normal or by the justification wedges. An example of this record-strip controlled mechanism is described and shown in the specification of U. S. Patent No. 625,998. The bar 84 is suitably guided in the main casting 56 of the strip feed assembly (Figure 10) so that it is only free to move longitudinally. The bar 84 is positioned to lie horizontally beneath the negative 45 and is provided with a hole 86 of about ¼″ square in order to permit the free passage of light between that particular character or the like on the negative 45 which is to be projected, and the camera lens 59. The drum bar 85 is free to move in a horizontal line parallel to that in which the bar 84 moves. On the drum bar 85 are pivoted two cranks 87, 88 (Fig. 23) which drive two feed drums 66 and 67. The radii of the drums are made equal to that of the cranks so that the ratio 30/71 will not be disturbed. Since the motion of the bar 84 in one direction only has to be transmitted to the feed drums, provision has accordingly to be made. The cranks 87, 88 are therefore free to rotate on the axes of the feed drums 66, 67 and the flanged discs 89, keyed on the feed drum shafts 75 are drawn against the cranks by a number of solenoids 90 operating only when the bar 84 moves in the appropriate direction, as illustrated in Figures 24 to 26. On the return stroke the solenoids are out of operation and the cranks return to their original position without affecting the feed drums. Further sets of solenoids 91 secured to the main casting are provided to hold the flanged discs 89 stationary during the return strokes. The solenoids 90 and 91 are energised alternately at appropriate intervals of time by a contact sector 92 on the main shaft 92ª (Figure 33) from an electrical circuit. The electrical circuit (Figure 33) comprises an electric motor 93, a starter 94 and a speed regulator 95, the motor being operatively connected to the main driving shaft 92ª carrying sector 92 which is in circuit with main line through contacts 92$^k$ carried by disc 92$^h$ on the vertical shaft 92$^f$. Sector 92 is in circuit with solenoids 90, 91 controlling the intermittent film strip feed through contacts 92$^b$ and 92$^c$. Disc 92$^h$ carries on its lower face, cams 114 and 115 controlling the feed of the film strip for the margin at the beginning and ending of each line. Figs. 33 and 36.

If instead of maintaining the length of the two arms of the lever in the proportion of 30/71 this ratio is varied, there will result an increase or reduction in the extent of movement of the drum bar 85. This will increase or reduce the amount of space occupied by the characters but not their actual dimensions which are controlled by the camera part of the apparatus. The text matter may thus be "extended" or "condensed" which is equivalent to increasing or reducing the set of the face.

Means for effecting variation in set of the projected character are illustrated in Figures 20 to 23 of the accompanying drawings. In this arrangement the two ends of the lever comprising the two arms 82, 83 are left undisturbed and only the fulcrum 82ª is moved. The arms 82, 83 of the lever are held in a sleeve member 96 to which is pivotally connected a forked lever or support 97 the rear end of which is formed with a grooved part 98 of substantially H cross-section to slide laterally in a correspondingly formed guide 99 formed in cap 100 secured to the casing. The forked lever or support 97 is provided at an intermediate position on either side with projecting members 101, 102 which are engaged respectively by the arms of pivoted members 103, 104, which are adapted to bear at the outer ends against a spring stop 105 and against the end of a differential screw 106. By means of the screw 106 the members 103, 104 may be operated to move the forked lever or support 97 laterally in either direction and thus to alter the fulcrum position. The movements of the fulcrum to produce these variations is small.

Figure 28:
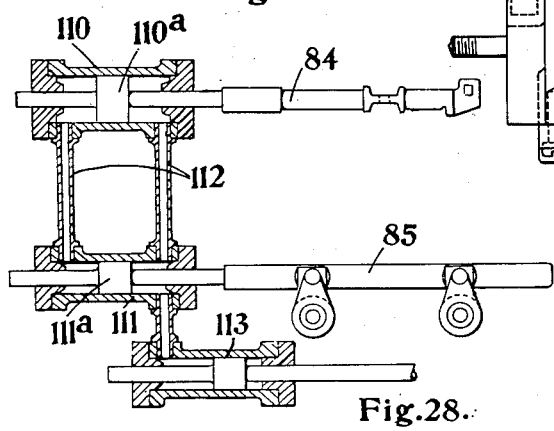
Figure 28 is a diagrammatic view of an alternative hydraulic feed system.

As an alternative to the mechanical method hereinbefore described, the movement of the bar 84 may be magnified and transmitted to the film feed drums 66 and 67 by a hydraulic system such as illustrated in Figure 28, which comprises two parallel disposed cylinders 110, 111 in communication with each other at their respective ends through conduits 112. The effective areas of the cylinders are in the ratio of the required magnification. The two pistons 110a, 111a are connected through piston rods to the bar 84 and the feed drum bar 85 respectively. A pump 113 is provided to control the pressure on the oil or liquid used during the movement of the pistons.

Figure 32:
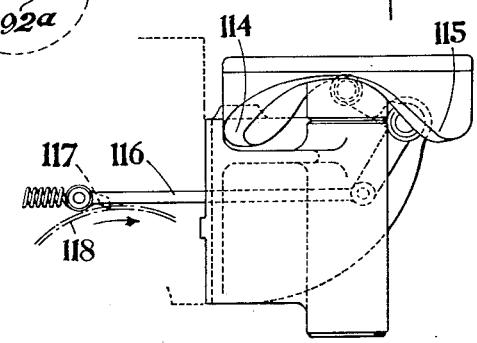
Figure 32 is an elevation taken from one side of the cam mechanism, operating the marginal feed.
Figure 2:
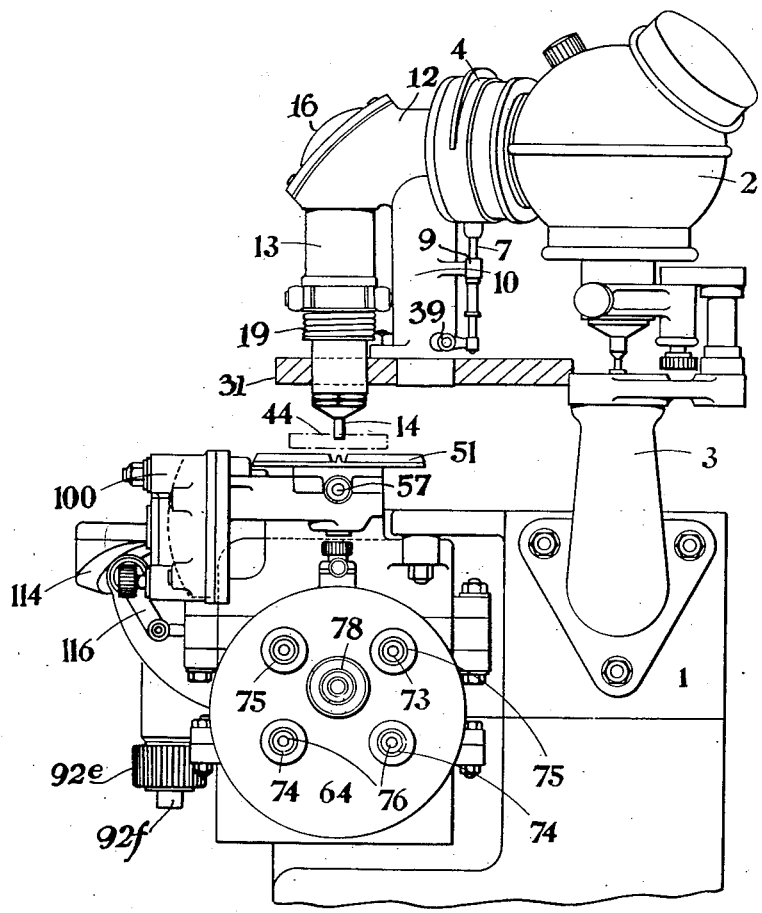
Figure 2 is a corresponding side elevation.
Figure 3:
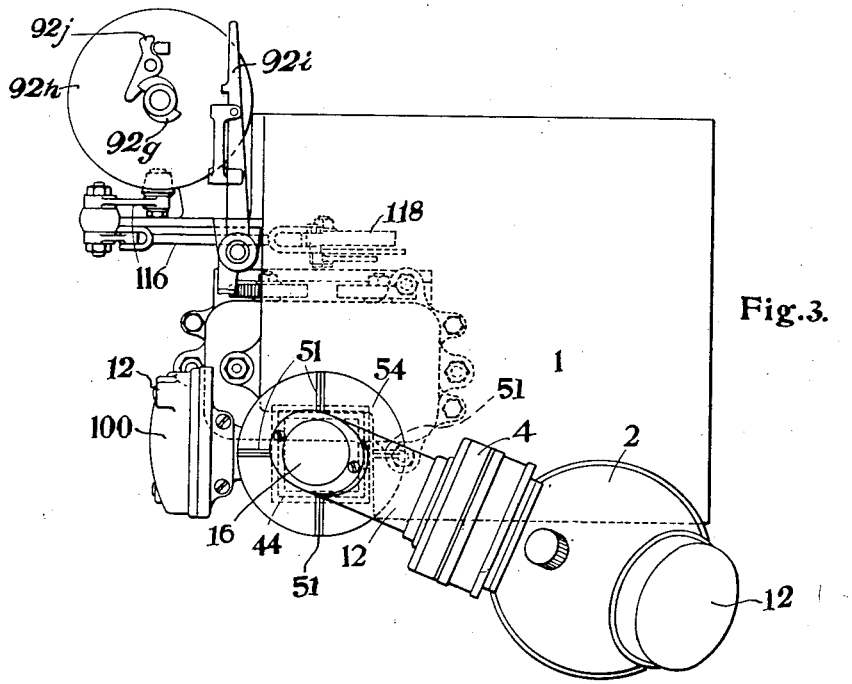
Figure 3 is a corresponding plan.

The margins at the beginning and end of each line are fed on by mechanism independent of the drum feed in order to avoid cumulative errors which might arise if the mould-blade mechanism alone were used. This mechanism (Figs. 1, 2, 3 and 32) comprises a worm 92$^d$ driven from the main shaft 92ª and is in constant mesh with a worm wheel 92$^e$ on a shaft 92$^f$. On the opposite end of this shaft 92$^f$ is fixed a ratchet 92$^g$ having two teeth disposed at 180° apart. This ratchet 92$^g$ is rotated constantly by means of the worm 92$^d$ and motion is transmitted intermittently by the ratchet to the disc 92$^h$ under the control of the record-strip. Between adjacent lines of text composition, signals in the record-strip cause a trip lever 92$^i$ (Fig. 3) to move and release a pawl 92$^j$ which is mounted on the disc 92$^h$. The pawl 92$^j$ engages the ratchet 92$^g$ and motion is transmitted to the disc 92$^h$. On the disc 92$^h$ are mounted contacts 92$^k$ which are normally closed, while the disc is stationary but which break the electric circuit when the disc is rotated. The cams 114 and 115 are mounted on the underside of the disc and are arranged at 180° to each other. One cam feeds a margin at the end of a line and the other at the beginning of the next line. The cams 114, 115 through linkage 116 (Figs. 2, 3, 19, 32) operate a pawl 117 (Fig. 32) which periodically engages a ratchet wheel 118 which makes one revolution per line and which in turn rotates the two feed drum gears. Any one of nine interchangeable ratchet wheels having different numbers of teeth may be used to provide for the chosen line measures of 12½ ems to 32½ ems in steps of 2½ ems. The numbers of teeth may be from 50 to 130 in steps of 10. Each ratchet may be provided with a device such as a pivoted arm 119 carrying a guard 120 the position of which may be adjusted by pin and slot connection 121 to determine the number of ratchet teeth to be moved forward by the pawl. Thus for small margins the extent of movement of the pawl will be less than for large margins. With this arrangement it will be possible to provide for two equal margins each of from ¼ to 1¼ ems, in any one length of line or measure. The object in providing a ratchet wheel with a particular number of teeth to correspond with the particular line measure adopted, is to ensure that each ratchet wheel makes one complete revolution per line. Reference has been made to U. S. Patent No. 625,998, covering a type casting and composing machine, to which the present invention may be applied.

In such an application certain elements of said machine are discarded while certain other elements are retained in whole and still other elements retained and slightly modified to suit the new elements introduced.

Those parts of the machine referred to which are eliminated entirely, are covered by the mould blade, the casting pot and galley with their controls and operating mechanism; with the exception of the cam disc 319 (Figs. 2, 72) which is retained with its pawl and pawl release.

The disc as retained and modified, as hereinbefore disclosed (Figs. 1–3, 32, 35–37) is used to operate the interline marginal feed.

A master negative with its carriers and a light carrying tube are substituted for the matrix with its carriers and the matrix centering rod, and function substantially in the same manner, receiving their vertically reciprocating movement from a similar system of levers actuated by a cam on the main driving shaft, as those used for the substituted parts.

The record strip feeding mechanism with its air connections to the primary controller stop pins, as well as the controls for the normal, transfer and justifying wedges are retained.

All normal, transfer and justifying wedges with their selective means connecting with the lever operating the matrix carrier, together with die or matrix centering mechanism through the primary controller or fixed gage, the primary positioning or gaging means, the secondary positioning or gaging means and the translating devices, including the system of jaws, levers and locking means actuated by cams on the main driving shaft to position a matrix over the mould or to justify a line, are retained and utilized to position a character of the master plate at the light locus and to justify the line.

The slide for setting the mould blade, with its connected rod and actuating cam and levers are retained to control the feed of the light sensitive strip for characters and the justifying spacing.

As previously stated the movements and operations of the apparatus are controlled by a record-strip of the kind described. This record-strip is moved step-by-step in each cycle of the apparatus, over a bar having a series of air ports selected combinations of which are open to the passage of air by perforations in the record-strip. These air ports are in two main groups. One group leads by channels to a series of air-operated pins D and the other group to a similar series of air-operated pins D'. A normal signal in the record-strip to move the master plate 45 to center a selected character, as previously described, comprises one component related with the pins D and one related with the pins D$^1$. Jaws operated for example by cam and lever mechanism close from opposite sides on any pin projected in the group D. Between these jaws is a head F on a rod F$^1$ attached to a frame which receives a projecting nose of one of the carriers 42 of the sub-frame 44 and master plate 45. The carrying frame 42 is thus moved to center the row in which lies the character or symbol to be projected.

Similar jaws close upon any projected pin in the group D$^1$. In closing on a pin these jaws carry with them a head G of a rod G$^1$ attached to the second carrier 43 for the master plate, and this carrier is free to slide in the carrier 42 and at right angles to the movement of that carrier. This movement determines the column to be brought over the lens. Thus the continued movement of the carriers centers the selected character over the lens.

The jaws in addition to moving the carrier 43 also act on the normal wedge A, already referred to, to position this wedge in accordance with the width of the character to be projected.

When under the control of the record strip, the carriers 42 and 43 have been moved to center the selected character and this character has been projected on to the sensitized strip X, then the bar 84 is drawn by its cam operated lever, against the stop formed by the normal wedges A and the normal transfer wedge C a distance in accordance with the width of said projected or photographed character.

Each time an inter-word space is to be inserted in the composition on the line-strip X, a port is uncovered by a perforation in the record strip and air passes to an air-operated pin which causes the normal transfer wedge C to be withdrawn and the justifying transfer wedge C$^1$ to be inserted so that the variable stop for the bar 84 is formed by the normal wedges A, the justifying transfer wedge C$^1$ and the justifying wedges B and B$^1$.

When a line of composition is completed, the sensitized line strip must be advanced to provide sufficient margins at the end of the composed line and in front of the line next to be composed. For this purpose a perforation in the record strip uncovers an air passage to a pin which moves lever 91$^1$ to release the pawl 92$^j$. This pawl now engages the ratchet 92$^g$ causing the disc 92$^h$ with cams 114 and 115 to rotate and feed forward the sensitized strip X in two stages as already described. During this movement the electric circuits (Figs. 33 and 36) for the solenoids 90, 91 will be broken as already explained.

Before any perforations in the record strip for positioning the master plate permit air to reach the pins D, D$^1$ at the commencement of a fresh line of composition, perforations are presented to set the justification stop for the bar 84. One perforation in the record strip serves to displace the normal transfer wedge from operative engagement with the normal wedge and to place in operative position the justifying transfer wedge. One or two perforations, as may be necessary for the justifying space requirement, serve to raise through pins either or both the justifying wedges B, B$^1$ to bring either or both their lugs B$^3$, B$^2$ in the path of the jaws controlled by the pins D$^1$. The closing of said jaws combine the normal, justifying and justifying transfer wedges into a stop or gage for bar 84 for the justification spacing of the line composed.

The product of the machine is a strip of exposed film or other sensitised surface, one line wide, and bearing in its light-sensitive surface, in longitudinal sequence along the strip, light images of a large number of justified lines of characters, with interposed line margin or page margin spaces between the justified lines, the development and fixing of which are performed independently in subsequent treatments.

The invention consists in the novel steps, sequences, elements and combinations as pointed out in the accompanying claims, and it will be understood that departures may be made from the specific forms shown and described without departing from the principles of the invention and without sacrificing its chief advantages.

I claim:

1. A mechanism for photographically composing typographic matter in lines including in combination a light tube for directing light with an end for a stop at an exposure locus, said tube enclosing a beam of light projected to said exposure locus, means for selectively moving a master character plate in a plane to present a selected character on an exposure axis, locking means for locating said master plate at the exposure locus, means for moving the master character plate from said plane into engagement with the locking means, means for moving the end of the light tube against the character plate, means for presenting a line-wide light-sensitive strip at an exposure locus, and means for moving said strip longitudinally, preparatory to impressing a presented character on the strip by light action, a distance corresponding to the width of the character about to be impressed.

2. A mechanism for photographically composing typographic matter in justified lines including in combination means for projecting light at an exposure locus, means for selectively moving a master character plate in a single plane to present a selected character on an exposure axis, means for moving the master character plate from said plane to an exposure locus, means for presenting a line-wide light-sensitive strip at an exposure locus, means for moving said strip longitudinally, preparatory to impressing a presented character on the strip by light action, a distance corresponding to the width of the character about to be impressed, and means cooperating with said last-mentioned means for longitudinally feeding said line strip between the impression of successive words variable distances to justify to a predetermined line measure.

3. A mechanism for photographically composing typographic matter in justified lines comprising in combination means for projecting light at a fixed exposure locus of an objective, means for selectively presenting the successive characters of a composition singly at the fixed exposure locus, means for presenting and exposing a line-wide, light-sensitive strip at a conjugate exposure locus, means for storing and advancing a line-wide strip, said means including fixed rotatable feeding means over which the strip is fed and mechanisms operating between the exposure of successive characters for rotating said feeding means proportionally to the width of a character next to be impressed and mechanism for rotating said feeding means between the exposure of two words selected variable distances to justify to a predetermined line measure.

4. A mechanism for photographically composing typographic matter in lines including in combination a carrier bearing a negative comprising a plurality of typographic characters, a light tube having an end forming a stop at an exposure locus and enclosing a beam of light projected to said exposure locus, means for moving said carrier to present successively single selected characters on an exposure axis, means for moving the master character plate along said axis to said exposure locus, means for moving said light tube end against said character plate, means for presenting a light-sensitive line strip at an exposure locus on said axis, and means operating to move said strip longitudinally, preparatory to impressing a presented character on the strip by light action, a distance corresponding to the width of the character about to be impressed.

5. A mechanism for photographically composing typographic matter in lines including in combination a carrier bearing a negative comprising a plurality of typographic characters, a light tube having an end forming a stop at an exposure locus and enclosing a beam of light projected to said exposure locus, means for moving said carrier to present successively single characters at the fixed exposure locus, means for presenting and exposing a light-sensitive line strip at an alined exposure locus, said means including fixed, rotatable feeding means over which the strip is fed, means for variably operating said feeding means to move said line strip longitudinally a distance corresponding to the width of the character next to be impressed, a lens having the exposure loci on its axis, a shutter controlling the light passing through the lens to said strip, and means for operating the shutter between successive feeds of the film strip.

6. A mechanism for photographically composing text matter in justified lines, including in combination a master plate bearing an assemblage of typographic characters, symbols and the like, a lens, movable carriers for the master plate, record-strip controlled positioning mechanism for moving said carriers in two directions in a single plane to center a selected character relatively to the lens and for moving the carrier and master plate in another direction to lock the master plate, record strip-controlled mechanism for variably advancing a light-sensitized line strip relatively to the lens according to the width of each character projected and record strip-controlled mechanism for advancing said line-strip for each justification space.

7. A mechanism for photographically composing text matter in justified lines including in combination a movable master plate bearing an assemblage of typographic symbols, characters, and blank spaces, a lens, winding and unwinding spools for a sensitized line-strip, mechanism for selectively moving the master plate under control of a record strip to position selected characters or blank spaces relatively to the lens, a film driving drum under one control by the record-strip to advance the sensitized strip a variable amount according to the width of each single character projected and under another control by the record strip to advance the sensitized strip a variable amount for inter-word spaces, and a second driving mechanism for the drum under a third control by the record strip to advance the sensitized strip for inter-linear spaces.

8. A mechanism for photographically composing text matter in justified lines including in combination a movable master plate, an image projecting lens having its axis normal to and intersecting the master plate, carrying frames for the master plate, record strip-controlled mechanism for selectively moving said carrying frame in two directions to position a selected character in line with the lens, a sub-frame supporting the master plate loosely mounted in one of the carrying frames, racks on the sub-frame, locking bars on the machine frame, mechanism for lowering the sub-frame to engage said racks with the locking bars and adjusting mechanism for said locking bars.

9. A mechanism for photographically composing text matter in justified lines including in combination a master plate supported to be movable in two directions, a support for a sensitized line-strip, a lens focussing the image of the master plate on the line strip, record-strip controlled positioning mechanism for centering a selected character on the master plate relatively to the lens, mechanism for lowering the master plate, a clamping device on the support for the sensitized strip, a screen in the clamping device and mechanism for operating the clamping device in timed relation to the feed movements of the strip and the movements of the positioning mechanism for the master plate.

10. A mechanism for photographically composing text matter in justified lines, including in combination a master plate, an image projecting lens having its axis normal to and intersecting the master plate selective positioning mechanism for the master plate controlled from a record strip to position a selected character or the like on the plate over the lens, winding and unwinding spools and a feeding drum for a sensitized line-strip, driving mechanism therefor operated from a constantly rotating cam, separate variable stops for said driving mechanism for characters and inter-word spaces, respectively, and a record strip-controlled mechanism for positioning or setting the said stops as required.

11. A mechanism for photographically composing text matter in justified lines, including in combination a two-way movable master plate, a lens, mechanism for moving the master plate to center a selected character relatively to the lens, a movable light-projecting tube between the lens and the master plate, mechanism for lowering the master plate, mechanism for moving said tube into contact with the master plate, a shutter controlling the light passing through the lens, and mechanism for operating the shutter in timed relation with the positioning of the master plate, the tube and the feed mechanism for a sensitized line strip.

12. A mechanism for photographically composing text matter in justified lines, including in combination a movable master plate, an image projecting lens having its axis normal to and intersecting the master plate mechanism for selectively positioning the master plate to center a character thereon relatively to the lens, a support for a sensitized line-strip, winding and unwinding spools and a driving sprocket for the line-strip, driving mechanism for said sprocket, variable stops for said driving mechanism, and record-strip controlled mechanism for setting said stops for characters of different widths and also for inter-word spaces of various widths to produce justified lines.

13. A mechanism for photographically composing text matter in justified lines, including in combination a two-way movable master plate, an image projecting lens having its axis normal to and intersecting the master plate and mechanism for moving the master plate to center a selected character relatively to the lens, a support for a sensitized line strip, winding and unwinding spools and a driving sprocket for the sensitized strip, driving mechanism for said sprocket, a variable stop for the driving mechanism, feeding solenoids for the sprocket, holding solenoids for the sprocket and means for energizing said solenoids alternately and in timed relation with the movements of said sprocket-driving mechanism.

GEORGE WESTOVER.